W. C. GRAY.
TROLLEY CAR HEADLIGHT.
APPLICATION FILED NOV. 20, 1911.
1,120,810.
Patented Dec. 15, 1914.
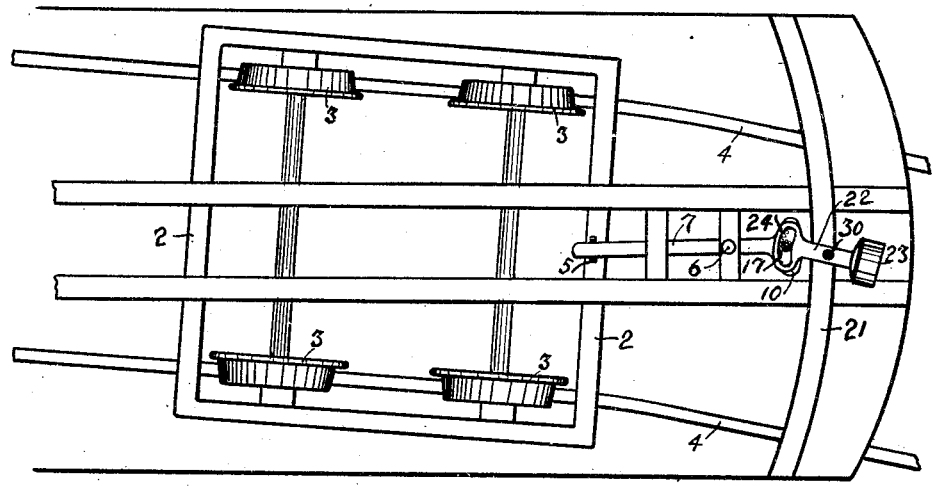

UNITED STATES PATENT OFFICE.

WILLIAM C. GRAY, OF ROCHESTER, NEW YORK, ASSIGNOR OF ONE-HALF TO ALBERT M. THOMPSON, OF ROCHESTER, NEW YORK.

TROLLEY-CAR HEADLIGHT.

1,120,810.    Specification of Letters Patent.    Patented Dec. 15, 1914.

Application filed November 20, 1911. Serial No. 661,385.

*To all whom it may concern:*

Be it known that I, WILLIAM C. GRAY, a citizen of the United States, residing at Rochester, in the county of Monroe and State of New York, have invented certain new and useful Improvements in Trolley-Car Headlights, of which the following is a specification.

This invention relates to headlights for trolley cars, locomotives or other vehicles having a rigid body supported at the front end by a truck pivoted thereunder, which truck rests and travels on any kind of a highway or road, or on a track of any of the ordinary steel rails.

The invention relates more particularly to means for supporting the headlight on the car body and automatically deflecting it from the front truck, so as to keep the light pointed in the direction in which the car is traveling, turning it to coincide with the track when the car or other vehicle is rounding a curve, as well as keeping it pointed straight ahead while the car is traveling on a straight portion of the highway, road or track, the headlight being controlled by the swinging of the front truck of the car.

The invention also consists in certain novel features of construction and combination of parts which will be hereinafter more fully described and pointed out in the claim.

In the accompanying drawings, Figure 1 is a plan view of the car, looking at the car body and trucks from above. Fig. 2 is a side elevation of the car body and truck. Fig. 3 is a section on the line 3$^x$—3$^x$ in Fig. 2. Fig. 4 is a section on the line 4$^x$—4$^x$ in Fig. 3. Fig. 5 is a section on the line 5$^x$—5$^x$ in Fig. 3. Fig. 6 is a section on the line 6$^x$—6$^x$ in Fig. 2. Fig. 7 is a top plan view of the headlight and arm which supports it. Fig. 8 is a section on the line 8$^x$—8$^x$ of Fig. 7. Fig. 9 is a section on the line 9$^x$—9$^x$ of Fig. 6. Fig. 10 is an enlarged section of the upper portion of Fig. 6, showing the clutch open. Fig. 11 is a section on the line 11$^x$—11$^x$ of Fig. 10.

Like reference numerals refer to like parts in the several figures of the drawings.

In Fig. 2 I show the platform 1 of a car which is pivotally mounted at its front end on a truck 2, which truck has four wheels 3, 3 thereon which travel on the track 4. Mounted on the front end of this truck is an upright U-shaped bracket 5. Pivotally mounted at 6 beneath the car body is a lever 7, which engages with the bracket 5 on the front end of the car truck. A strap 9 is provided beneath the car body which supports the lever 7 and holds it loosely in proper position. At the front end the lever 7 carries the inclosed sector gear 10, with the teeth of which meshes the pinion 11 mounted on the upright shaft 12. The shaft 12 passes through the floor of the car and up through the standard or inclosing casing 13 mounted on the floor of the car. This standard at the top has a horizontal flange thereon, on the outside of which is a vertical flange, forming a cup shaped opening. In this cup shaped opening rests the casing 14, the foot of which is flanged as shown at 15. Up through the casing 14 passes the shaft 16, on top of which is supported the pinion 17, which pinion turns integrally with said shaft 16. Pivoted in the flange at the top of the casing 13 is a lever 18 having an eccentric 19 thereon which bears against the flange 15 at the bottom of the upper shaft casing 14. By moving the lever 18 to the position shown in Fig. 11, the casing 14 is raised, and by turning it down so that it is parallel with the shaft 12, the casing 14 may be lowered. When the casing 14 is raised it bears against the pinion 17 carried on the upper shaft 16 and raises the upper shaft 16. Between the upper shaft 16 and the lower shaft 12 is provided a clutch 20. The ends of each shaft are provided alternately with projections and recesses, the projections of one engaging with the recesses of the other when the one is moved longitudinally into engagement with the other.

Mounted in the front upright portion 21 of the car on the pivot 30, is the arm 22 of the headlight. This arm carries at its front end the headlight 23, and at its rear end the inclosed sector gear 24. This arm 22 is pivoted at such a height that the sector gear normally comes into engagement with the pinion 17 heretofore described. When the upper shaft 16 is raised as heretofore described, the pinion 17 travels up and remains in engagement with the teeth of the sector gear 24, and when it is lowered it travels down, still remaining in engagement with the teeth, as when it is up in the position shown in Fig. 10 the headlight will remain idle and be free to swing in every direction, irrespective of the lateral movement of the trucks, and when the clutch is closed, as shown in Fig. 6, the headlight will then move to the right when the forward end of the truck swings to the right, and will move to the left when the forward end of the truck swings to the left.

It will be understood that the length of the levers 7 and 22 and the gearing between them will be so proportioned as to make the headlight swing through the same angular movement that the truck swings through when it is rounding a curve, bringing the headlight back to a normally straight position when the car is running on a straight portion of the track.

Having thus described my invention, what I claim as new and patentable is as follows:

The combination in a car of a car body, a truck pivotally mounted under said car body, a lever pivotally mounted on the car body and engaging with said truck, a headlight pivotally mounted on said car body, a shaft and gearing connecting said lever and said headlight for simultaneous movement, a clutch in said shaft whereby said headlight may be moved or rendered idle independent of the movement of the truck and the lever, and an eccentric pivoted adjacent to said clutch for operating said clutch.

In testimony whereof I affix my signature in presence of two witnesses.

WILLIAM C. GRAY.

Witnesses:
 ALICE M. JOHANNS,
 A. M. THOMPSON.

Copies of this patent may be obtained for five cents each, by addressing the "Commissioner of Patents, Washington, D. C."